US012236758B1

(12) United States Patent
Haushalter et al.

(10) Patent No.: US 12,236,758 B1
(45) Date of Patent: *Feb. 25, 2025

(54) SYSTEMS, METHODS, AND MEDIA FOR IMPLEMENTING INTERNET-BASED WAGERING

(71) Applicant: EVOLUTION MALTA LIMITED, Sliema (MT)

(72) Inventors: Todd Haushalter, St Julians (MT); Fredrik Bjurle, London (GB)

(73) Assignee: Evolution Malta Limited, Sliema (MT)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,747

(22) Filed: Jul. 11, 2023

Related U.S. Application Data

(63) Continuation of application No. 17/245,791, filed on Apr. 30, 2021, now Pat. No. 11,727,760, which is a (Continued)

(51) Int. Cl.
*G07F 17/32* (2006.01)

(52) U.S. Cl.
CPC ...... *G07F 17/3288* (2013.01); *G07F 17/3209* (2013.01); *G07F 17/3225* (2013.01); *G07F 17/3211* (2013.01)

(58) Field of Classification Search
CPC ............. G07F 17/3288; G07F 17/3209; G07F 17/3225; G07F 17/3211; G07F 17/3213;

(Continued)

(56) References Cited

U.S. PATENT DOCUMENTS 4,337,945 A * 7/1982 Levy .................... A63F 9/0079 273/142 E
4,391,442 A * 7/1983 Levy .................... A63F 9/0079 273/142 E (Continued)

FOREIGN PATENT DOCUMENTS

WO WO 2016118075 7/2016

OTHER PUBLICATIONS

Notice of Allowance dated Feb. 18, 2021 in U.S. Appl. No. 16/268,104, pp. 1-137.

(Continued)

*Primary Examiner* — David L Lewis
*Assistant Examiner* — Matthew D Hoel
(74) *Attorney, Agent, or Firm* — Byrne Poh LLP

(57) ABSTRACT

Mechanisms for wagering comprising: receiving bet information describing bets, wherein the bet information includes a bet amount and a bet position on a game wheel for each bet; determining a payout amount for each bet; receiving first wheel spin information including a first wheel stop position for a first spin of the game wheel; determining that the first wheel stop position is one of at least one multiplier position on the game wheel having a multiplier value, and applying the multiplier value to the payout amount for each bet; receiving final wheel spin information including a final wheel stop position for a final pin f of the game wheel; and determining that the final wheel stop position is one of non-multiplier positions on the game wheel, and causing payouts to be made to each of the bets having a bet position matching the final wheel stop position.

36 Claims, 5 Drawing Sheets

Related U.S. Application Data continuation of application No. 16/268,104, filed on Feb. 5, 2019, now Pat. No. 11,024,125.

(60) Provisional application No. 62/626,267, filed on Feb. 5, 2018.

(58) Field of Classification Search
CPC . G07F 17/3444; G07F 17/3255; G07F 17/323
See application file for complete search history.

(56) References Cited

U.S. PATENT DOCUMENTS

| | | | | |
|---|---|---|---|---|
| 4,396,193 | A * | 8/1983 | Reinhardt | A63F 5/0005<br>463/22 |
| 4,869,505 | A * | 9/1989 | Manabe | G07F 17/3262<br>273/142 E |
| 4,906,005 | A * | 3/1990 | Manabe | G07F 17/3262<br>463/22 |
| 4,995,374 | A * | 2/1991 | Black | A01K 15/025<br>124/32 |
| 5,042,810 | A * | 8/1991 | Williams | A63F 3/00157<br>273/143 R |
| 5,588,650 | A * | 12/1996 | Eman | G07F 17/32<br>463/25 |
| 5,707,285 | A * | 1/1998 | Place | G07F 17/322<br>463/25 |
| 5,718,431 | A * | 2/1998 | Ornstein | A63F 3/00157<br>273/274 |
| 5,743,798 | A * | 4/1998 | Adams | G07F 17/3262<br>273/142 E |
| 5,743,800 | A * | 4/1998 | Huard | G07F 17/32<br>463/16 |
| 5,788,574 | A * | 8/1998 | Ornstein | G07F 17/3244<br>463/25 |
| 5,851,010 | A * | 12/1998 | Feinberg | A63F 3/00157<br>273/274 |
| 5,934,999 | A * | 8/1999 | Valdez | A63F 3/00157<br>273/142 E |
| 6,047,965 | A * | 4/2000 | Mollo | A63F 5/00<br>273/142 D |
| 6,059,659 | A * | 5/2000 | Busch | A63F 5/00<br>273/274 |
| RE37,588 | E * | 3/2002 | Ornstein | A63F 3/00157<br>273/274 |
| 6,481,717 | B1 * | 11/2002 | Richardelle | A63F 3/00157<br>273/274 |
| 6,659,866 | B2 * | 12/2003 | Frost | G07F 17/32<br>463/17 |
| 6,679,492 | B2 * | 1/2004 | Markowiak | A63F 3/00157<br>273/274 |
| 6,755,741 | B1 * | 6/2004 | Rafaeli | G07F 17/322<br>463/25 |
| 7,094,150 | B2 * | 8/2006 | Ungaro | G07F 17/3211<br>463/16 |
| 7,331,868 | B2 * | 2/2008 | Beaulieu | G07F 17/32<br>463/30 |
| 7,661,676 | B2 * | 2/2010 | Smith | A63F 1/12<br>463/31 |
| 7,669,853 | B2 * | 3/2010 | Jones | A63F 1/18<br>463/40 |
| 7,758,425 | B2 * | 7/2010 | Poh | G07F 17/3293<br>463/16 |
| 7,892,083 | B2 * | 2/2011 | Okada | A63F 5/00<br>463/17 |
| 8,147,319 | B2 * | 4/2012 | Hornik | G07F 17/3239<br>463/19 |
| 8,177,628 | B2 * | 5/2012 | Manning | G07F 17/3225<br>463/16 |
| D663,785 | S * | 7/2012 | Walsh | D21/375 |
| 8,216,047 | B2 * | 7/2012 | Bartosik | G07F 17/3213<br>463/17 |
| 8,272,958 | B2 * | 9/2012 | Smith | G07F 17/3211<br>463/33 |
| 8,444,470 | B2 * | 5/2013 | Gurule | G07F 17/3267<br>463/30 |
| 8,622,830 | B2 * | 1/2014 | Radek | G07F 17/3218<br>463/31 |
| 8,641,515 | B2 * | 2/2014 | Nicely | G07F 17/3227<br>463/25 |
| 8,727,863 | B2 * | 5/2014 | Gurule | A63F 5/00<br>463/20 |
| 9,098,981 | B2 * | 8/2015 | Chun | G07F 17/3227 |
| 9,327,186 | B1 * | 5/2016 | Pececnik | A63F 5/0088 |
| 9,384,624 | B2 * | 7/2016 | Fong | G07F 17/3262 |
| 9,552,698 | B2 * | 1/2017 | Berman | G07F 17/3213 |
| 9,600,974 | B2 * | 3/2017 | Yee | G07F 17/3244 |
| 9,779,576 | B2 * | 10/2017 | Shoenhair | G07F 17/326 |
| 10,121,317 | B2 * | 11/2018 | Berman | G07F 17/3225 |
| 10,147,267 | B2 * | 12/2018 | Yee | G07F 17/322 |
| 10,497,201 | B2 * | 12/2019 | Chun | G07F 17/3227 |
| 10,504,321 | B2 * | 12/2019 | Burgstaller | G07F 17/322 |
| 10,629,024 | B1 * | 4/2020 | Haushalter | G07F 17/3225 |
| 10,672,221 | B2 * | 6/2020 | Jackson | G07F 17/322 |
| 10,706,668 | B2 * | 7/2020 | Burgstaller | A63F 5/0005 |
| 11,011,014 | B1 * | 5/2021 | Haushalter | G07F 17/322 |
| 11,024,125 | B1 * | 6/2021 | Haushalter | G07F 17/3225 |
| 11,049,361 | B2 * | 6/2021 | Jackson | G07F 17/3211 |
| 11,222,510 | B2 * | 1/2022 | Baskerville | G07F 17/3288 |
| 11,756,371 | B1 * | 9/2023 | Haushalter | G07F 17/322<br>463/17 |
| 2002/0142823 | A1 * | 10/2002 | DeMar | G07F 17/3244<br>463/16 |
| 2003/0071417 | A1 * | 4/2003 | Webb | A63F 3/00157<br>273/292 |
| 2004/0023712 | A1 * | 2/2004 | Oliver | G07F 17/3258<br>463/18 |
| 2004/0116177 | A1 * | 6/2004 | Frost | G07F 17/3262<br>463/17 |
| 2004/0166930 | A1 * | 8/2004 | Beaulieu | G07F 17/32<br>463/25 |
| 2004/0259627 | A1 * | 12/2004 | Walker | G07F 17/34<br>463/20 |
| 2005/0020347 | A1 * | 1/2005 | Moshal | A63F 5/00<br>463/17 |
| 2005/0032568 | A1 * | 2/2005 | Griswold | G07F 17/32<br>463/16 |
| 2005/0091108 | A1 * | 4/2005 | Frost | G07F 17/32<br>705/14.35 |
| 2005/0164759 | A1 * | 7/2005 | Smith | G07F 17/32<br>463/11 |
| 2005/0181852 | A1 * | 8/2005 | Groves | G07F 17/3293<br>463/13 |
| 2005/0192076 | A1 * | 9/2005 | Lowery | A63F 5/00<br>463/17 |
| 2006/0148549 | A1 * | 7/2006 | Walker | G07F 17/323<br>463/16 |
| 2007/0060262 | A1 * | 3/2007 | Kosaka | A63F 5/00<br>463/16 |
| 2007/0075490 | A1 * | 4/2007 | Gak | A63F 3/00157<br>273/146 |
| 2007/0149283 | A1 * | 6/2007 | Poh | G07F 17/3209<br>463/37 |
| 2007/0173310 | A1 * | 7/2007 | Walker | G07F 17/32<br>463/16 |
| 2007/0254733 | A1 * | 11/2007 | Hornik | G07F 17/32<br>463/20 |
| 2008/0058068 | A1 * | 3/2008 | Bennett | G07F 17/32<br>463/20 |
| 2008/0132312 | A1 * | 6/2008 | Yoshizawa | G07F 17/32<br>463/16 |
| 2008/0139297 | A1 * | 6/2008 | Beaulieu | G07F 17/34<br>463/20 |
| 2008/0188288 | A1 * | 8/2008 | Seelig | G07F 17/3202<br>463/20 |
| 2008/0254876 | A1 * | 10/2008 | Koustas | G07F 17/3272<br>463/28 |

(56) References Cited

U.S. PATENT DOCUMENTS

| | | | | |
|---|---|---|---|---|
| 2008/0258383 A1* | 10/2008 | Sorge | A63F 3/00157 273/142 E |
| 2008/0274783 A1* | 11/2008 | Walker | G07F 17/32 463/43 |
| 2009/0005165 A1* | 1/2009 | Arezina | G07F 17/3244 463/37 |
| 2009/0023495 A1* | 1/2009 | Koustas | G07F 17/3288 463/43 |
| 2009/0093290 A1* | 4/2009 | Lutnick | G07F 17/3237 463/16 |
| 2009/0098921 A1* | 4/2009 | Manning | G07F 17/32 463/17 |
| 2009/0239605 A1* | 9/2009 | Ekisheva | G07F 17/329 463/17 |
| 2010/0075744 A1* | 3/2010 | Baratti | G07F 17/3216 463/31 |
| 2010/0120508 A1* | 5/2010 | Vann | G07F 17/34 463/20 |
| 2010/0124966 A1* | 5/2010 | Kido | G07F 17/34 273/142 E |
| 2010/0148442 A1* | 6/2010 | Walker | A63F 5/00 273/142 E |
| 2011/0223983 A1* | 9/2011 | Schwartz | G07F 17/34 463/30 |
| 2012/0172102 A1* | 7/2012 | Gurule | A63F 5/00 463/17 |
| 2012/0172103 A1* | 7/2012 | Gurule | A63F 5/00 463/17 |
| 2013/0053117 A1* | 2/2013 | Snow | G07F 17/322 273/303 |
| 2013/0184059 A1* | 7/2013 | Costello | G07F 17/326 463/22 |
| 2013/0184079 A1* | 7/2013 | Costello | G07F 17/3223 463/42 |
| 2014/0087829 A1* | 3/2014 | Watkins | G07F 17/3267 463/20 |
| 2014/0094244 A1* | 4/2014 | Baron | G07F 17/323 463/17 |
| 2014/0100031 A1* | 4/2014 | Fong | G07F 17/3211 463/31 |
| 2017/0193747 A1* | 7/2017 | Yee | G07F 17/3286 |

OTHER PUBLICATIONS

Notice of Allowance dated Mar. 30, 2023 in U.S. Appl. No. 17/245,791, pp. 1-10.

Office Action dated Jan. 13, 2020 in U.S. Appl. No. 16/268,104, pp. 1-17.

Office Action dated Apr. 1, 2022 in U.S. Appl. No. 17/245,791, pp. 1-190.

Office Action dated Jun. 28, 2019 in U.S. Appl. No. 16/268,104, pp. 1-14.

Office Action dated Jul. 10, 2020 in U.S. Appl. No. 16/268,104, pp. 1-108.

Office Action dated Dec. 7, 2022 in U.S. Appl. No. 17/245,791, pp. 1-12.

Scarne, J., "Scarne's Complete Guide to Gambling", Simon and Schuster, New York, 1961, pp. 353-385.

* cited by examiner

400

SYSTEMS, METHODS, AND MEDIA FOR IMPLEMENTING INTERNET-BASED WAGERING

CROSS-REFERENCE TO RELATED APPLICATION

This application is a continuation of U.S. patent application Ser. No. 17/245,791, filed Apr. 30, 2021, which is a continuation of U.S. patent application Ser. No. 16/268,104, filed Feb. 5, 2019, which claims the benefit of U.S. Provisional Patent Application No. 62/626,267, filed Feb. 5, 2018, each of which is hereby incorporated by reference herein in its entirety.

BACKGROUND

Wagering is a popular recreational activity for adults around the world. In traditional wagering, a player would have to travel to a casino to place wagers. While casinos are enjoyable, traveling to one can be expensive and time consuming.

Internet-based wagering system allow players to wager from home without the need to travel to a casino. Unfortunately, however, many internet-based wagering systems are simply computer-generated interfaces that do not replicate in any way a real environment like is present in a casino.

Accordingly, it is desirable to provide internet-based wagering that replicates aspects of a real casino.

SUMMARY

Systems, methods, and media for implementing internet-based wager are provided. In accordance with some embodiments, systems for wagering are provided, the systems comprising: a game wheel having a plurality of positions including at least one multiplier position and at least one non-multiplier position; and a hardware processor configured to: receive bet information describing bets from a plurality of player devices, wherein the bet information includes a bet amount and a bet position on the game wheel for each of the bets; determine a payout amount for each of the bets; receive first wheel spin information including a first wheel stop position for a first spin of the game wheel; determine that the first wheel stop position is one of the at least one multiplier position having a multiplier value, and apply the multiplier value to the payout amount for each of the bets; receive final wheel spin information including a final wheel stop position for a final spin of the game wheel; and determine that the final wheel stop position is one of the non-multiplier positions, and cause payouts to be made to each of the bets having a bet position matching the final wheel stop position.

In accordance with some embodiments, methods for wagering are provided, the methods comprising: receiving bet information describing bets at a hardware processor from a plurality of player devices, wherein the bet information includes a bet amount and a bet position on a game wheel for each of the bets; determining a payout amount for each of the bets using the hardware processor; receiving first wheel spin information including a first wheel stop position for a first spin of the game wheel using the hardware processor; determining that the first wheel stop position is one of at least one multiplier position on the game wheel having a multiplier value using the hardware processor, and applying the multiplier value to the payout amount for each of the bets using the hardware processor; receiving final wheel spin information including a final wheel stop position for a final spin of the game wheel using the hardware processor; and determining that the final wheel stop position is one of non-multiplier positions on the game wheel using the hardware processor, and causing payouts to be made to each of the bets having a bet position matching the final wheel stop position using the hardware processor.

In accordance with some embodiments, non-transitory computer-readable media containing computer executable instructions that, when executed by a processor, cause the processor to perform a method for wagering are provided, the method comprising: receiving bet information describing bets from a plurality of player devices, wherein the bet information includes a bet amount and a bet position on a game wheel for each of the bets; determining a payout amount for each of the bets; receiving first wheel spin information including a first wheel stop position for a first spin of the game wheel; determining that the first wheel stop position is one of at least one multiplier position on the game wheel having a multiplier value, and applying the multiplier value to the payout amount for each of the bets; receiving final wheel spin information including a final wheel stop position for a final spin of the game wheel; and determining that the final wheel stop position is one of non-multiplier positions on the game wheel, and causing payouts to be made to each of the bets having a bet position matching the final wheel stop position.

DETAILED DESCRIPTION

Figure 1:
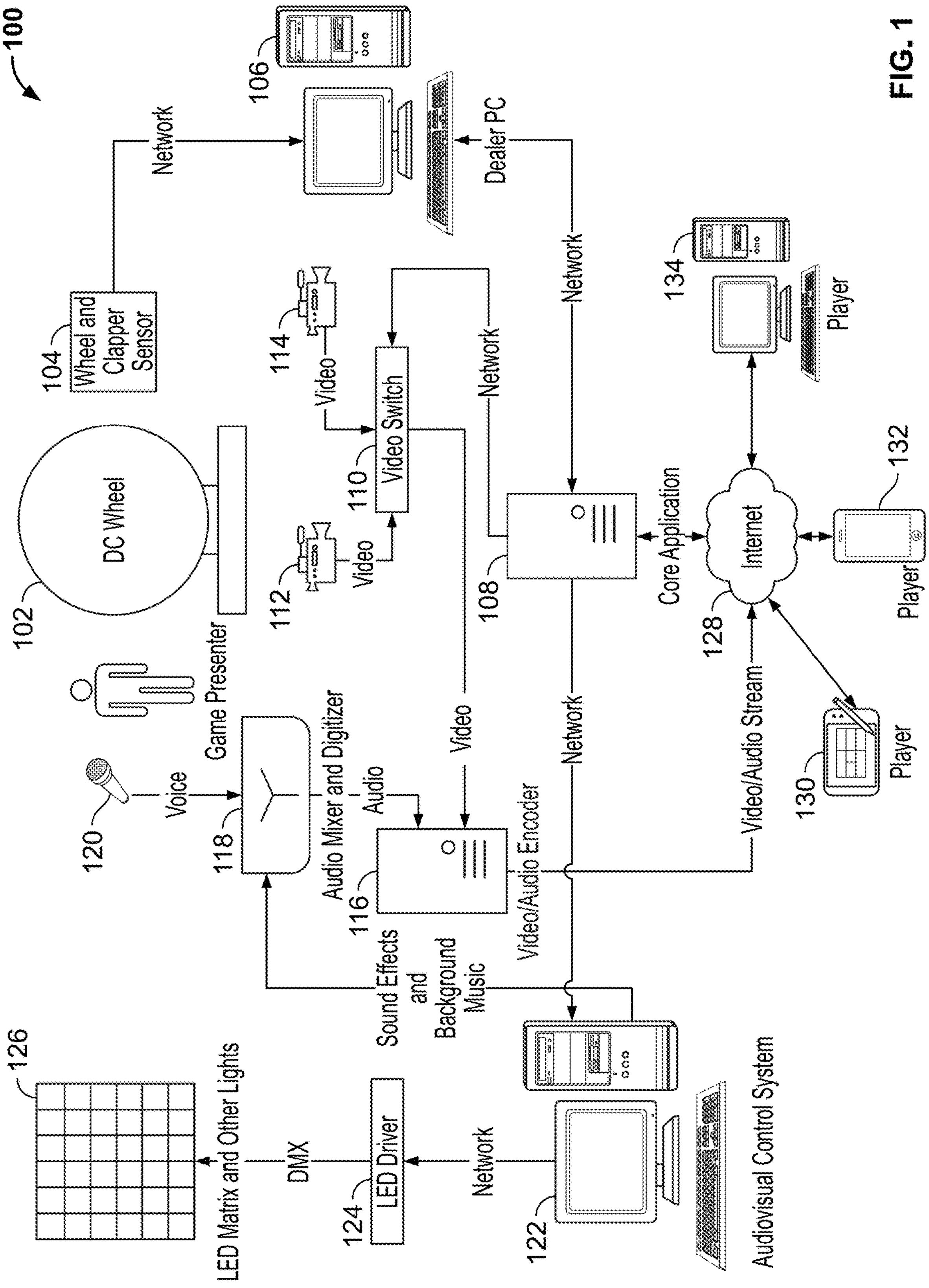
FIG. 1 is an example of a system for implementing an internet-based wagering system in accordance with some embodiments.

Turning to FIG. 1, an example 100 of a system for implementing internet-based wagering in accordance with some embodiments is shown. As illustrated, system 100 includes a game wheel 102, a wheel and clapper sensor 104, a dealer computer 106, a core application computer 108, a video switch 110, cameras 112 and 114, a video/audio encoder 116, an audio mixer and digitizer 118, a microphone 120, an audiovisual control system 122, an LED driver 124, an LED matrix 126, a computer network 128, a tablet player device 130, a smart phone player device 132, and a computer player device 134.

Figure 4:
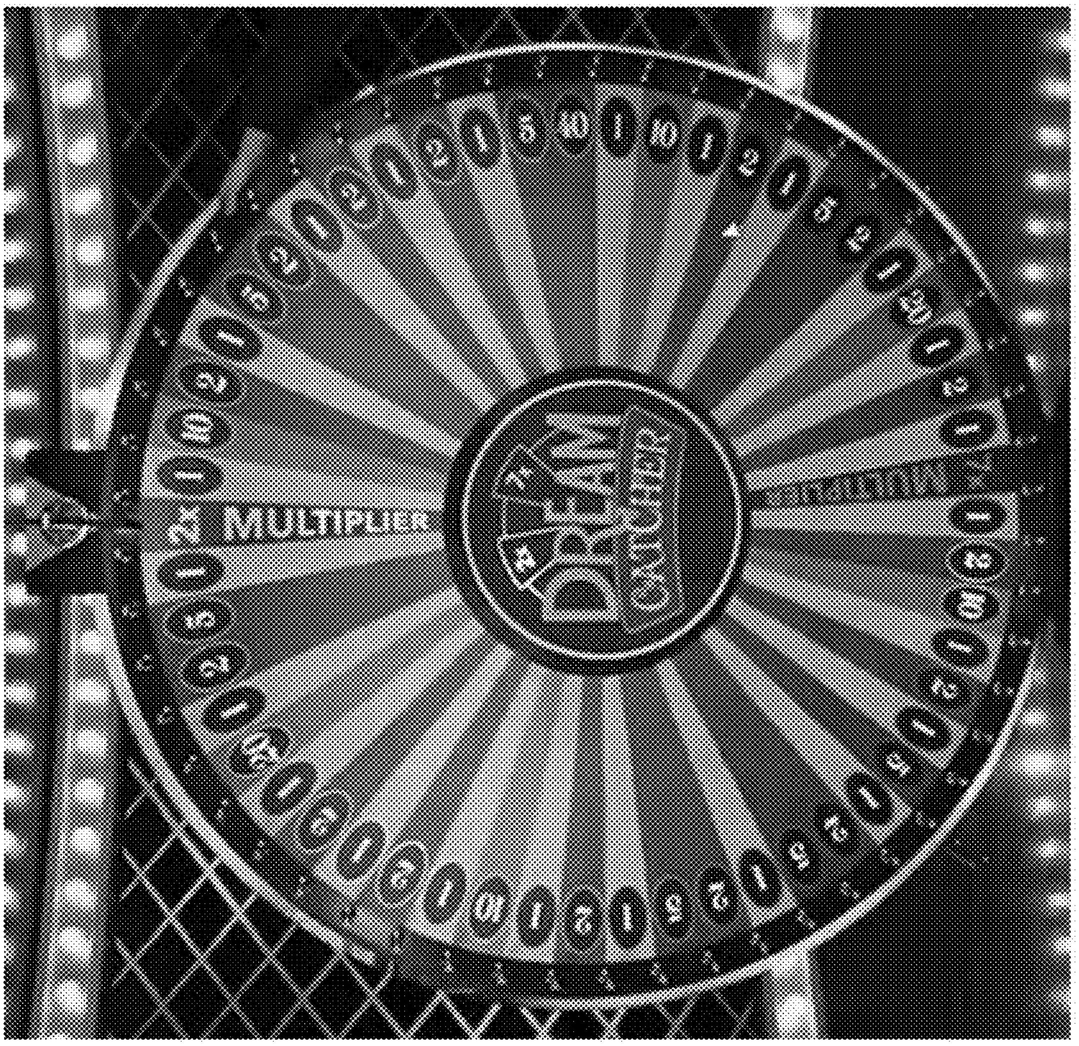
FIG. 4 is an example of a game wheel that is used in an Internet-based wagering game in accordance with some embodiments.

Game wheel 102 can be any suitable game wheel for implementing a wagering game. This game wheel can be a real, physical game wheel. For example, game wheel 102 can be implemented using game wheel 400 as shown in FIG. 4. As illustrated in this figure, the game wheel can include any suitable number of positions. In some embodiments, 54 positions can be provided as shown in FIG. 4. These positions can be separated by pins in the wheel in some embodiments. During use, in some embodiments, a human dealer (or game presenter) spins the wheel by hand and eventually the wheel stops spinning and a pointer at the top of the wheel points to one of the positions. One or more cameras, described below, can be pointed at the wheel and capture video that is transmitted to player devices participating in a game involving the wheel.

Each of the positions on the wheel can be any of a plurality of types. For example, as shown in FIG. 4, one or more positions can be of a "1" gold type, one or more positions can be of a "2" blue type, one or more positions can be of a "5" purple type, one or more positions can be of a "10" green type, one or more positions can be of a "20" orange type, one or more positions can be of a "40" red type, one or more positions can be of a "2× Multiplier" type, and one or more positions can be of a "7× Multiplier" type. Although specific example of position types are described herein, any suitable position types can be used, and any suitable number of different types of position types can be used. Moreover, even though specific numbers of the different position types are shown in FIG. 4, any suitable number (including zero) of each type can be used in some embodiments.

In some embodiments, the position types represent how a payout will be made should a player's wager include a selection of that position type and should a position having that position type be pointed to by a pointer on the wheel following a spin. For example, if a player places a wager on a "10" green position type and, after a wheel spin, the wheel's pointer points to any of the four positions illustrated in FIG. 4 as being of that position type, the player will receive a payout of 10 times the bet amount.

In some embodiments, a position type can be a multiplier (e.g., "2× Multiplier" or "7× Multiplier") that increases the payout of a bet should a subsequent spin land on a position having the type corresponding to the bet. For example, in the example in the previous paragraph, should a spin of the wheel have first landed on a position of the type "2× Multiplier" in a spin just prior to a spin landing on a position having the "10" green position type, the payout would be 20 times the bet amount.

Referring back to FIG. 1, wheel and clapper sensor 104 can detect the spinning of a wheel and the position pointed to by the pointer when the wheel stops spinning. The sensor can be implemented in any suitable manner. For example, the sensor can be implemented as a bar code scanner that points at bar codes on the outer circumference of the wheel in each position.

Dealer computer 106 can be any suitable computer that can be used by a game presented to monitor game activity. For example, in some embodiments, computer 106 can be used to monitor how sensor 104 is sensing the wheel, to manually enter wheel position data, to view video feeds of the wheel, and to see gaming data relating to bets, payouts, previous plays, and/or any other suitable data.

Core application computer 108 can be any suitable computer that controls the activity of the game being presented by system 100. This can include generating user interfaces, presenting user interfaces to devices 130, 132, and 134, receiving input from players via those user interfaces, receiving bet information, causing money wagered to be collected, receiving data from sensor 104 and/or computer 106, applying game rules, determining payouts, causing payout money to be paid, controlling video that is streamed to players, and/or any other suitable functions.

Video switch 110 can receive video from cameras 112 and 114 and provide it to video/audio encoder 116. Any suitable video switch can be used in some embodiments.

Video/audio encoder 116 can be any suitable video and/or audio encoder. In some embodiments, encoder 116 can be implemented as multiple encoders, any of which encoders can be different from any others of the encoders. For example, when using multiple encoders, some may be video encoders and some may be audio encoders. Some may be high definition encoders, while others can be standard definition encoders, as another example.

Audio mixer and digitizer 118 can be any suitable audio mixer and digitizer for receiving sound-effect signals and background-music signals from audiovisual control system 122 and voice signals from microphone 120, mixing those signals, digitizing those signals, and providing those signals to encoder 116.

Microphone 120 can be any suitable microphone for capturing the voice of a game presenter (or dealer). In some embodiments, microphone 120 can be part of another device, such as a headset, one of cameras 112 and 114, etc.

Audiovisual control system 122 can be any suitable computer system for controlling sound effects, background music, light emitting diodes in matrix 126, any other suitable lights, etc. In some embodiments, system 122 can receive inputs from core application computer 108 that causes special sounds and/or lights (or any other effects) to be presented when certain events happen during the course of play (e.g., such as a big payout being paid, the wheel landing on a multiplier position, etc.).

LED driver 124 can be any suitable driver circuitry for driving LEDs, lights, and/or any other visual effects that are presented on or around the wheel and/or in the field of view of one or more of cameras 112 and 114.

LED matrix 126 can be any suitable collection of one or more LEDs, lights, and/or any other visual effects that are presented on or around the wheel and/or in the field of view of one or more of cameras 112 and 114. For example, in some embodiments, LEDs can be presented on the wheel to accentuate movement of the wheel, a position on the wheel landed upon when the wheel stops spinning, etc.

Computer network 128 can be any suitable communication network or combination of communication networks that can be used by a device 130, 132, and/or 134 for communicating with the remainder of system 100. For example, network 128 can include the Internet, one or more mobile telephone networks, one or more mobile data networks, one or more cable television networks, one or more satellite networks, one or more WiFi networks, one or more local area networks, one or more wide area networks, and/or any other one or more suitable communication networks.

Figure 3:
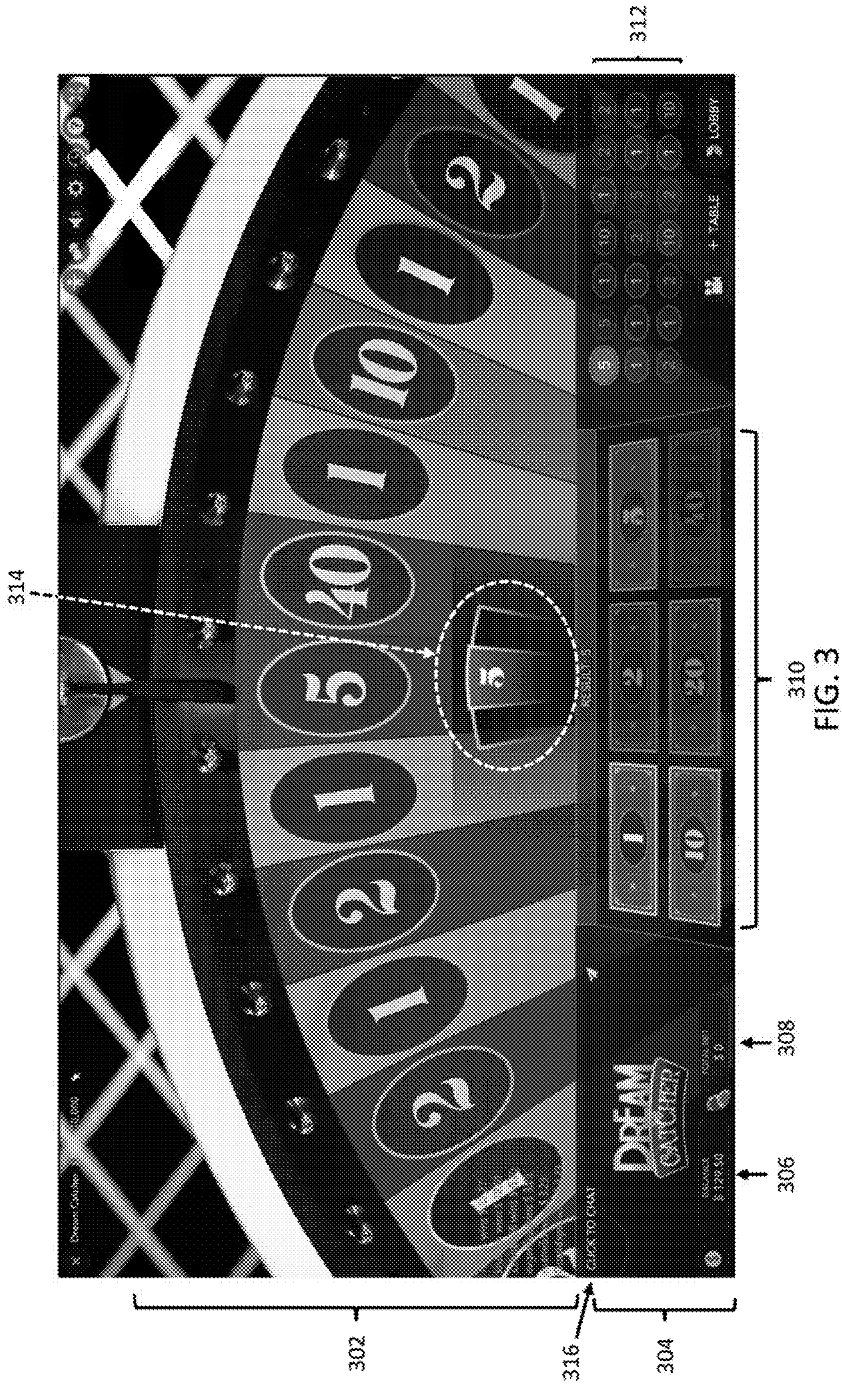
FIG. 3 is an example of a user interface for internet-based wagering in accordance with some embodiments.

Player devices 120, 132, and 134 can be any suitable devices for interacting with the remainder of system 100. For example, as shown in FIGS. 3 and 4, these devices can present a user interface, video, and audio that can allow a player to experience a wagering game. The devices can receive bets via the interface, indicate account balance, indicate past plays, provide video and/or audio of the wheel, provide video and/or audio of the game presenter, provide video and/or audio of the video effects, audio effects, music, etc., capture video and/or audio of a player using one of the devices, capture text input of the player, provide video and/or audio of other players, present text input of the other players, etc.

Figure 2:
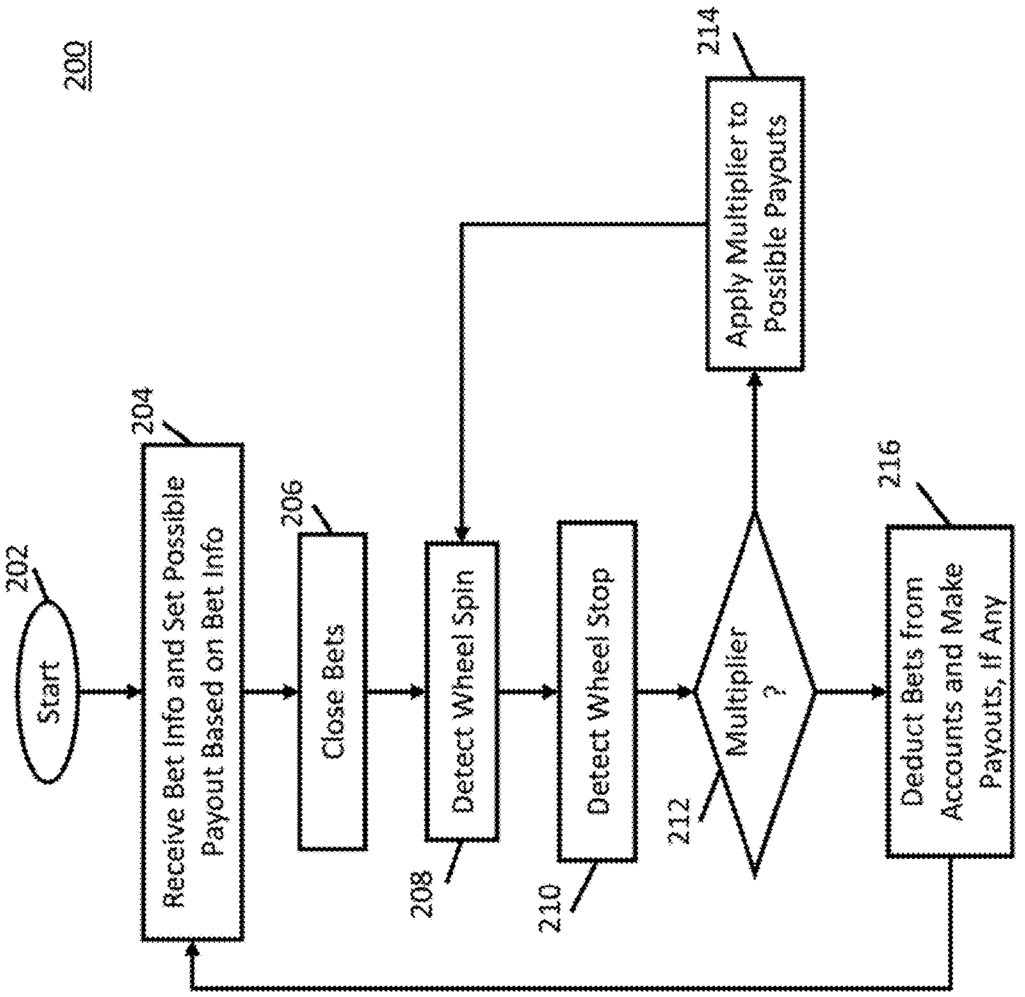
FIG. 2 is an example of a process for a wager game in accordance with some embodiments.

Turning to FIG. 2, an example 200 of a process for implementing a wagering game in accordance with some embodiments is shown. As illustrated, after process 200 begins at 202, the process can receive bet information and set possible payouts based on the bet information. Any suitable bet information can be received in some embodiments. For example, in some embodiments, the bet information can include a position type (e.g., "10" green or any other suitable type), a bet amount (e.g., $20 or any other suitable value), etc. Any suitable possible payouts can be set in some embodiments. For example, if a bet is for $20 on "10" green, the payout can be calculated to be $200 (i.e., 10 times $20). The position type may indicate the payout. For example, position type "1" can have a one times payout, position type "2" can have a two times payout, position type "5" can have a five times payout, position type "10" can have a ten times payout, position type "20" can have a twenty times payout, and position type "40" can have a forty times payout. Any other suitable position types and position type payouts can be used in some embodiments.

Next, at 206, bets can be closed by process 200. This can occur in response to a game presenter selecting on dealer computer 106 to close bets, based on an automatic timer, and/or based on any other suitable factors. Once bets are closed, players may be prevented from adding new bets, cancelling existing bets, and/or altering existing bets.

At 208 and 210, process 200 can detect a wheel spin and then a wheel stop respectively. As described above, these can be detected based on output from sensor 104. In some embodiments, 208 and 210 can be omitted and data on wheel spins (e.g., such as wheel position after a spin) can be received from manual entries on a dealer computer by a dealer (or game presenter).

At 212, process 200 can determine if the position on the wheel landed upon is a multiplier. If so, at 214, process 200 can apply the multiplier to the possible payouts set in 204. For example, if, as in the example above, a bet is for $20 on "10" green, the possible payout calculated at 204 would be $200. If it is determined at 212 that a "7× Multiplier" was landed upon, then at 214 process 200 would update the possible payout to be $1400. Following 214, process 200 loops back to 208 and then 210 to detect another wheel spin and stop. If another multiplier is detected at 212, that multiplier would once again be applied at 214 to the possible payouts. For example, if a "2× Multiplier" position is landed-upon following the "7× multiplier" position in the example immediately above, the possible payout would be updated to be $2800. Multipliers can stack in this manner any suitable number of times in some embodiments. In some embodiments, a maximum possible payout may limit the effect of stacked multipliers.

If at 212, it is determined that the wheel did not stop on a multiplier position, then at 216, process 200 can deduct bet money from player accounts (in some embodiments, the bet money may have been previously deducted or frozen at step 204 or 206) and make payouts of money. For example, if the wheel stopped on a "10" green position in the examples above, the possible payout of $2800 would be paid to the player's account.

Following 216, process 200 clears all bet information and loops back to 204 to proceed with the next play as described above.

In some embodiments, process 200 can be executed in computer 108.

Turning to FIG. 3, an example 300 of a user interface than can presented on a player device 130, 132, or 134 in accordance with some embodiments is shown. As illustrated, interface 300 can include a video area 302 and a betting interface area 304. Video area can show any suitable video including video of the wheel, video of a game presenter, video of LEDs, lights, and/or other visual effects that are captured using cameras 112 and 114. As described above, this video is of a real environment including a real wheel, real lights, a real game presenter, etc.

In some embodiments, video area 302 can show feedback 314 to the players of the position type detected following a spin of the wheel.

Betting interface area 304 can provide any suitable user interface elements for wagering in the game provided. For example, as shown, an account balance 306 and total bet amount 308 can be provided to show a player how much money the player has in the betting account and how much money the player is currently wagering, respectively. By clicking on amount 308 while bets are open, the player can change the bet amount. As another example, as shown in area 310, the player can select a position type on which to bet. As illustrated, area 310 includes icons for "1" gold, "2" blue, "5" purple, "10" green, "20" orange, and "40" red position types. Any suitable position types can be included in area 310. As yet another example, as shown in area 312, previous play information can be shown. For example, area 312 can show a purple "5" in the top left of area 312 to represent that the current play outcome was "5" purple. To the right of that, another "5" is shown indicating that the previous play outcome was "5" purple. To the right of that, a "1" is shown indicating that the previous play outcome was "1" gold. As yet another example, a "click to chat" field 316 can enable a player to open up a field in which the player can chat with the game presenter and/or other players.

Figure 5:
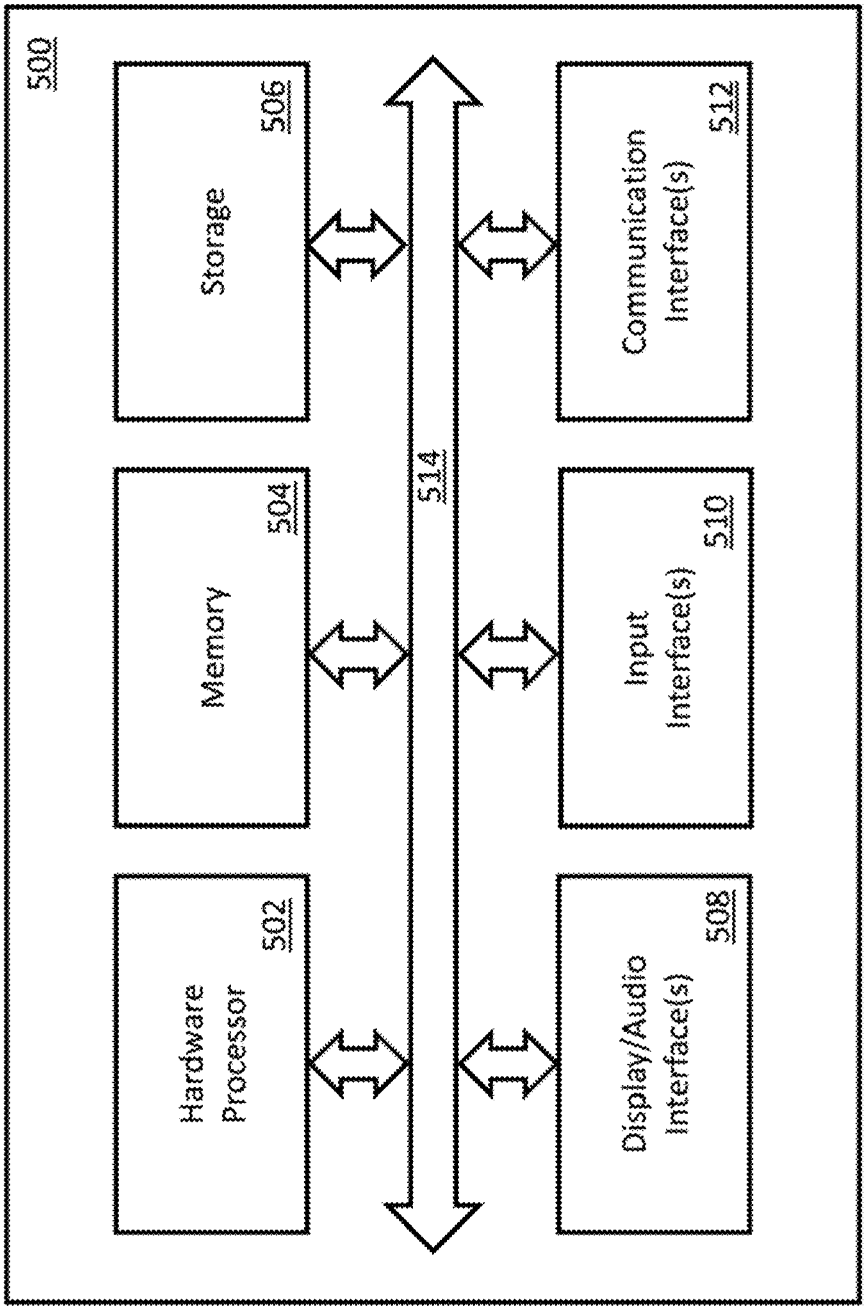
FIG. 5 is an example of hardware for implementing certain components of FIG. 1 in accordance with some embodiments.

Referring back to FIG. 1, components 106, 108, 116, 122, 130, 132, and 134 can be implemented using any suitable hardware. For example, in some embodiments, these components can be implemented using any suitable general-purpose computer or special-purpose computer. Any such general-purpose computer or special-purpose computer can include any suitable hardware. For example, as illustrated in example hardware 500 of FIG. 5, such hardware can include hardware processor 502, memory 504, storage 506, display/audio interface(s) 508, input interface(s) 510, communication interface(s) 512, and a bus 514.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments.

Memory 504 can be any suitable memory for storing programs, data, media content, and/or any other suitable information in some embodiments. For example, memory 504 can include random access memory, read-only memory, flash memory, and/or any other suitable memory.

Storage 506 can be any suitable storage for storing programs, data, media content, and/or any other suitable information in some embodiments. For example, storage 506 can include flash memory, hard disk drive, optical media, and/or any other suitable storage.

Display/audio interface(s) 508 can be any suitable circuitry for controlling and driving output to one or more display/audio output circuitries in some embodiments. For example, display/audio interface(s) 508 can be circuitry for driving an LCD display, a speaker, an LED, or any other type of output device.

Input interface(s) 510 can be any suitable circuitry for controlling and receiving input from any suitable input device(s) in some embodiments. For example, input interface(s) 510 can be any suitable circuitry for receiving input from an input device, such as a touch screen, from one or more buttons, from a voice recognition circuit, from a microphone, from a camera, from an optical sensor, from an accelerometer, from a temperature sensor, from a near field sensor, and/or any other type of input device.

Communication interface(s) 512 can be any suitable circuitry for interfacing with one or more communication networks, such as network 128 as shown in FIG. 1. For example, interface(s) 512 can include network interface card circuitry, wireless communication circuitry, and/or any other suitable type of communication network circuitry.

Bus 514 can be any suitable mechanism for communicating between two or more components 502, 504, 506, 508, 510, and 512 in some embodiments.

Any other suitable components can be included in hardware 500 in accordance with some embodiments.

It should be understood that at least some of the above described blocks of the process of FIG. 2 can be executed or performed in any order or sequence not limited to the order and sequence shown in and described in the figure. Also, some of the above blocks of the process of FIG. 2 can be executed or performed substantially simultaneously where appropriate or in parallel to reduce latency and processing times. Additionally or alternatively, some of the above described blocks of the process of FIG. 2 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments, the mechanisms described herein can be used to implement an Internet based gaming product. In some embodiments of such a product, the game wheel and dealer can be located in a studio (or any other suitable location (such as a casino)) and players use a player device from a remote location to place bets. In some embodiments, the mechanisms described herein can be additionally or alternatively be used to implement a casino game in which the game wheel and dealer are in a casino and players use player devices (which can be the player devices described in connection with FIG. 1 and/or dedicated gaming devices, such as a gaming terminal) within the casino. In some embodiments, the mechanisms described herein can be implemented in a fully electronic manner wherein no dealer or real game wheel is present. Rather, the game wheel can be computer generated. Players can access the game using the player devices described in connection with FIG. 1 and/or dedicated gaming devices, such as a gaming terminal. This can be implemented in a casino and/or over the Internet.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for wagering, comprising:

a game wheel having a plurality of positions including a first position of a first type and a plurality of positions of a second type, wherein a first position of the plurality of positions of the second type indicates on the game wheel a first position payout ratio that applies to the first position of the plurality of positions of the second type, and wherein for each spin of the game wheel it is possible for the game wheel to stop at any position of the first position of the first type and the plurality of positions of the second type; and at least one hardware processor configured to:

determine a first multiplier value based on a multiplier value indicated on the game wheel for the first position of the first type;

determine that a first wheel stop position for a first spin of the game wheel is the first position of the plurality positions of the second type; and determine that a first bet payout ratio for a first bet corresponding to the first position of the plurality positions of the second type is a product of at least the first multiplier value and the first position payout ratio.

2. The system of claim 1, wherein the at least one hardware processor is further configured to:

determine that a second wheel stop position for a second spin of the game wheel is the first position of the first type;

determine a second multiplier value in response the second wheel stop position;

determine a second bet payout ratio for a second bet based at least on the second multiplier value.

3. The system of claim 1, wherein the first position payout ratio is 2.

4. The system of claim 3, wherein a second position of the plurality of positions of the second type indicates a position payout ratio of 5 that applies to the second position of the plurality of positions of the second type.

5. The system of claim 4, wherein a third position of the plurality of positions of the second type indicates a position payout ratio of 10 that applies to the third position of the plurality of positions of the second type.

6. The system of claim 5, wherein a fourth position of the plurality of positions of the second type indicates a position payout ratio of 20 that applies to the fourth position of the plurality of positions of the second type.

7. The system of claim 6, wherein a fifth position of the plurality of positions of the second type indicates a position payout ratio of 40 that applies to the fifth position of the plurality of positions of the second type.

8. The system of claim 7, wherein a sixth position of the plurality of positions of the second type indicates a position payout ratio of 1 that applies to the sixth position of the plurality of positions of the second type.

9. The system of claim 1, wherein the at least one hardware processor is also configured to cause a video of the game wheel to be presented on a plurality of player devices.

10. The system of claim 1, wherein the at least one hardware processor is also configured to cause a user interface for receiving bet information to be presented on a plurality of player devices, wherein the user interface includes a plurality of currency shaped areas through which a player can indicate to place one or more bets.

11. The system of claim 1, wherein the at least one hardware processor is also configured to determine that the game wheel is spinning and to stop accepting bets for the first wheel spin when the game wheel is determined to be spinning.

12. The system of claim 1, wherein the first position of the first type indicates that it is different from the second type.

13. A method for wagering, comprising:

monitoring, using a hardware processor, a game wheel having a plurality of positions including a first position of a first type and a plurality of positions of a second type, wherein a first position of the plurality of positions of the second type indicates on the game wheel a first position payout ratio that applies to the first position of the plurality of positions of the second type, wherein for each spin of the game wheel it is possible for the game wheel to stop at any position of the first position of the first type and the plurality of positions of the second type;

determining a first multiplier value based on a multiplier value indicated on the game wheel for the first position of the first type;

determining that a first wheel stop position for a first spin of the game wheel is the first position of the plurality positions of the second type; and determining that a first bet payout ratio for a first bet corresponding to the first position of the plurality positions of the second type is a product of at least the first multiplier value and the first position payout ratio.

14. The method of claim 13, further comprising:

determining that a second wheel stop position for a second spin of the game wheel is the first position of the first type;

determining a second multiplier value in response the second wheel stop position;

determining a second bet payout ratio for a second bet based at least on the second multiplier value.

15. The method of claim 13, wherein the first position payout ratio is 2.

16. The method of claim 15, wherein a second position of the plurality of positions of the second type indicates a position payout ratio of 5 that applies to the second position of the plurality of positions of the second type.

17. The method of claim 16, wherein a third position of the plurality of positions of the second type indicates a position payout ratio of 10 that applies to the third position of the plurality of positions of the second type.

18. The method of claim 17, wherein a fourth position of the plurality of positions of the second type indicates a position payout ratio of 20 that applies to the fourth position of the plurality of positions of the second type.

19. The method of claim 18, wherein a fifth position of the plurality of positions of the second type indicates a position payout ratio of 40 that applies to the fifth position of the plurality of positions of the second type.

20. The method of claim 19, wherein a sixth position of the plurality of positions of the second type indicates a position payout ratio of 1 that applies to the sixth position of the plurality of positions of the second type.

21. The method of claim 13, further comprising causing a video of the game wheel to be presented on a plurality of player devices.

22. The method of claim 13, further comprising causing a user interface for receiving bet information to be presented on a plurality of player devices, wherein the user interface includes a plurality of currency shaped areas through which a player can indicate to place one or more bets.

23. The method of claim 13, further comprising determining that the game wheel is spinning and stop accepting bets for the first wheel spin when the game wheel is determined to be spinning.

24. The method of claim 13, wherein the first position of the first type indicates that it is different from the second type.

25. A non-transitory computer-readable medium containing computer executable instructions that, when executed by a processor, cause the processor to perform a method for wagering, the method comprising:

monitoring a game wheel having a plurality of positions including a first position of a first type and a plurality of positions of a second type, wherein a first position of the plurality of positions of the second type indicates on the game wheel a first position payout ratio that applies to the first position of the plurality of positions of the second type, wherein for each spin of the game wheel it is possible for the game wheel to stop at any position of the first position of the first type and the plurality of positions of the second type;

determining a first multiplier value based on a multiplier value indicated on the game wheel for the first position of the first type;

determining that a first wheel stop position for a first spin of the game wheel is the first position of the plurality positions of the second type; and determining that a first bet payout ratio for a first bet corresponding to the first position of the plurality positions of the second type is a product of at least the first multiplier value and the first position payout ratio.

26. The non-transitory computer-readable medium of claim 25, wherein the method further comprises:

determining that a second wheel stop position for a second spin of the game wheel is the first position of the first type;

determining a second multiplier value in response the second wheel stop position;

determining a second bet payout ratio for a second bet based at least on the second multiplier value.

27. The non-transitory computer-readable medium of claim 25, wherein the first position payout ratio is 2.

28. The non-transitory computer-readable medium of claim 27, wherein a second position of the plurality of positions of the second type indicates a position payout ratio of 5 that applies to the second position of the plurality of positions of the second type.

29. The non-transitory computer-readable medium of claim 28, wherein a third position of the plurality of positions of the second type indicates a position payout ratio of 10 that applies to the third position of the plurality of positions of the second type.

30. The non-transitory computer-readable medium of claim 29, wherein a fourth position of the plurality of positions of the second type indicates a position payout ratio of 20 that applies to the fourth position of the plurality of positions of the second type.

31. The non-transitory computer-readable medium of claim 30, wherein a fifth position of the plurality of positions of the second type indicates a position payout ratio of 40 that applies to the fifth position of the plurality of positions of the second type.

32. The non-transitory computer-readable medium of claim 31, wherein a sixth position of the plurality of positions of the second type indicates a position payout ratio of 1 that applies to the sixth position of the plurality of positions of the second type.

33. The non-transitory computer-readable medium of claim 25, wherein the method further comprises: causing a video of the game wheel to be presented on a plurality of player devices.

34. The non-transitory computer-readable medium of claim 25, wherein the method further comprises: causing a user interface for receiving bet information to be presented on a plurality of player devices, wherein the user interface includes a plurality of currency shaped areas through which a player can indicate to place one or more bets.

35. The non-transitory computer-readable medium of claim 25, wherein the method further comprises: determining that the game wheel is spinning and stop accepting bets for the first wheel spin when the game wheel is determined to be spinning.

36. The non-transitory computer-readable medium of claim 25, wherein the first position of the first type indicates that it is different from the second type.

* * * * *